Oct. 15, 1957  C. TREE  2,809,844
TOOL HOLDER
Filed Nov. 7, 1955  2 Sheets-Sheet 1

INVENTOR
CHARLES TREE
BY
Young & Wright
ATTORNEYS

Oct. 15, 1957
C. TREE
2,809,844
TOOL HOLDER
Filed Nov. 7, 1955
2 Sheets-Sheet 2
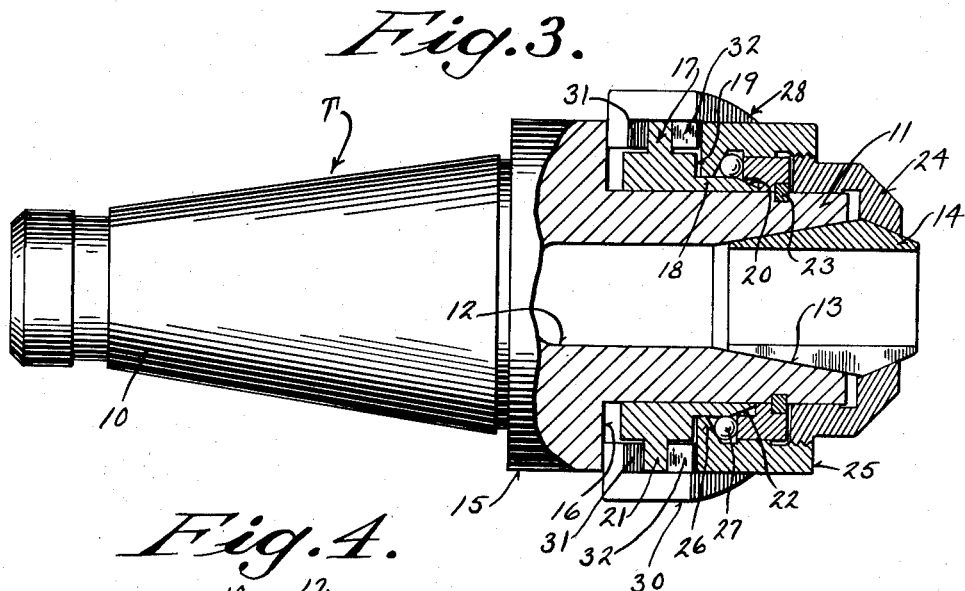
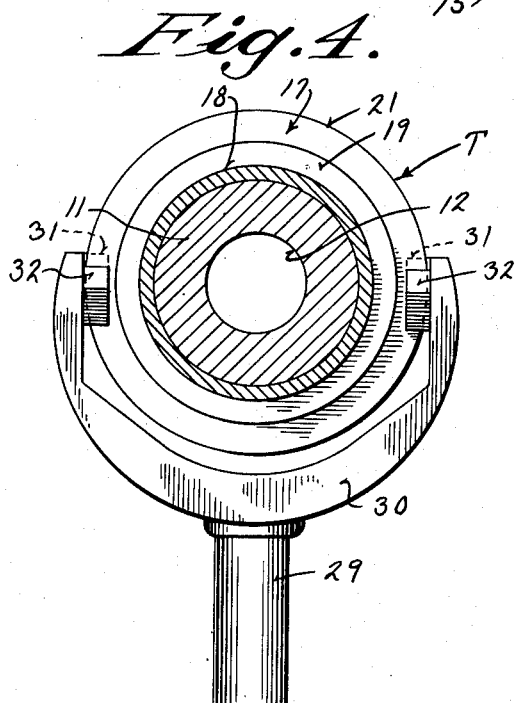
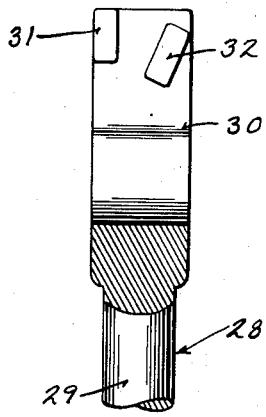
INVENTOR
CHARLES TREE
BY
*Young & Wright*
ATTORNEYS

United States Patent Office 2,809,844
Patented Oct. 15, 1957

2,809,844

TOOL HOLDER

Charles Tree, Racine, Wis.

Application November 7, 1955, Serial No. 545,176

2 Claims. (Cl. 279—42)

This invention appertains to a machine tool holder, and more particularly to a tool holder or chuck which can be associated with various types of metal working machines, such as milling machines, etc.

One of the primary objects of my invention is to provide a tool holder or chuck in which the tool can be quickly released or clamped by the mere actuation of a hand lever, whereby the turning of clamping nuts and the difficulty contingent therewith is entirely eliminated.

Another salient object of my invention is the provision of means for tightening or loosening a split collet for the tool by the sliding of a sleeve on the shank of the holder through the medium of a novelly formed hand lever.

A further important object of my invention is to provide a quick-change tool holder with the provision of means for releasing the collet from the shank of the holder when so desired, so that collets of different sizes for different diameters of tools can be utilized in the tool holder.

With these and other objects in view, the invention consists in the novel construction, arrangement and formation of parts, as will be hereinafter more specifically described and claimed, and illustrated in the accompanying drawings, in which drawings, Figure 1 is a side elevational view of my improved tool holder, with parts of the handle being shown broken away and in section, the handle being shown in full lines in its released position and in dotted lines in its locked position;

Figure 3 is a side elevational view of the holder looking at right angles from Figure 1, with the forward end of the handle in section, the holder being in its locked gripping position;

Figure 4 is a transverse sectional view through the holder taken on the line 4—4 of Figure 1, looking in the direction of the arrows, and Figure 5 is a fragmentary longitudinal sectional view through the manipulating handle, illustrating the novel arrangement of the throw lugs.

Figure 1:
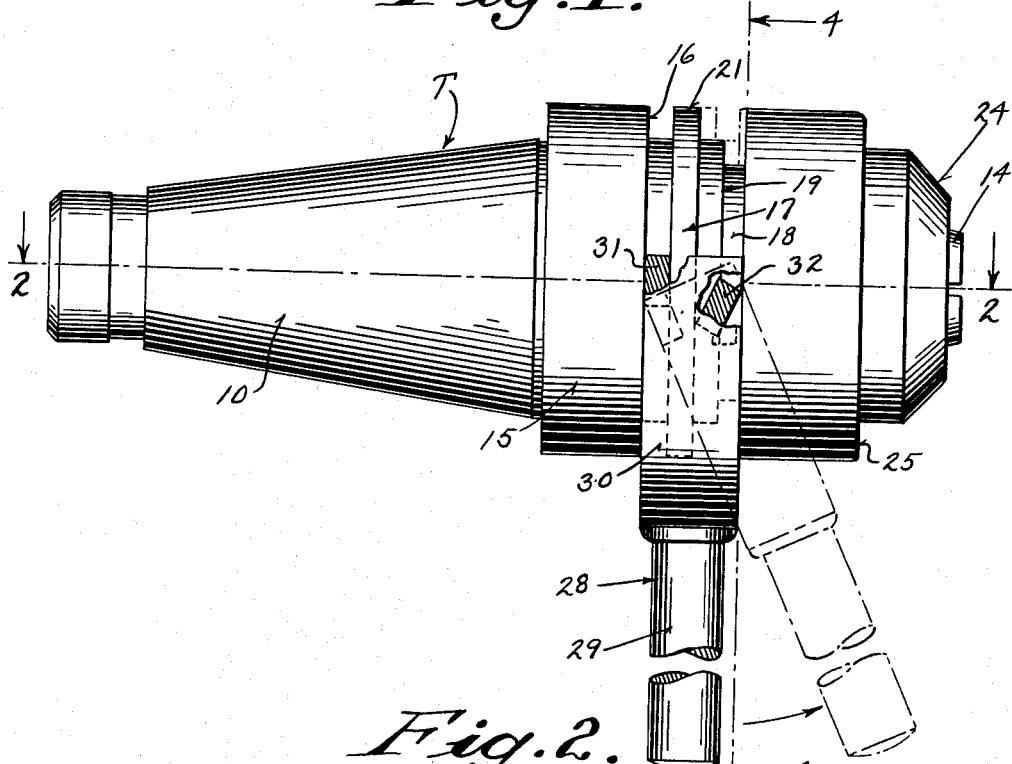

Referring to the drawings in detail, wherein similar reference characters designate corresponding parts throughout the several views, the letter T generally indicates my improved tool holder and the same includes a shank 10 having a tool receiving head 11, on its forward end. The rear end of the shank 10 can be formed in any desired manner for connection with the spindle of a metal working machine (not shown). The shank 10 is preferably formed with a longitudinally extending bore 12 and the forward end of the bore at the head end 11 thereof, is provided with an inwardly tapered seat 13 for the reception of a split collet 14. The shank intermediate its ends is provided with an annular rib 15 defining a front stop shoulder 16, for a purpose, which will later appear.

Slidably mounted on the shank 10 at the head end thereof and forwardly of the rib 15 is a shift sleeve 17, and this sleeve has limited sliding movement on the shank, and its rearward movement is stopped by the shoulder 16. The forward end of the shift sleeve is reduced in diameter as at 18, and this also provides an annular stop shoulder 19. The extreme forward end of the reduced portion 18 is tapered inwardly and forwardly to provide an inclined seat 20, for a purpose which will also hereinafter more fully appear. The shift sleeve also has formed thereon an annular rib 21. Forward sliding movement of the shift sleeve 17 is limited by a stationary lock ring 22, detachably held in place by a split lock ring 23 snapped in an annular groove formed in the shank.

The collet 14 is of the type now commonly used in tool holders and hence the same is tapered in opposite directions from a point intermediate its ends and the inner tapered portion of the collet fits within the seat 13 in the shank, as heretofore intimated, and the front forward tapered end of the collet has slidably mounted thereon the collet closing collar 24. An adjusting and releasing nut 25 is threaded on the collar 24 and this nut is slidably and rotatably mounted on the lock ring 22. The inner end of the adjusting and releasing nut 25 has formed thereon an inwardly directed annular flange 26 which slides on the reduced forward end 18 of the adjusting sleeve 17. Normal forward movement of the nut 25 is prevented by the lock ring 22 and confined between the lock ring 22 and the flange 26 is a series of pusher balls or bearings 27. It is to be understood that in the assembly of the collar, that the sleeve 17 is initially placed on the holder against the shoulder 16, after which the nut 25 with the lock ring 22 is slid on the collar with the balls 27 in place. When the parts are so positioned, the split ring 23 is then snapped into the groove on the holder and the clamp collet collar 24 is then threaded in place against the collet.

The sliding of the sleeve 17 brings about the expansion and contraction of the collet and I provide a hand lever 28 for manipulating the sleeve. This hand lever 28 includes a manipulating handle 29 and a semi-circular shaped yoke 30 for straddling the sleeve and the arms of the yoke have formed on their inner faces spaced pusher lugs 31 and 32. The lugs 32 are arranged at an angle to the lugs 31 and the lugs are so spaced as to receive the rib 21 of the sleeve 17 therebetween.

In operation of my holder and considering that the clamp collar 24 has been adjusted for engagement with the collet, then upon the swinging of the handle 29 to the right (see Figure 1), to its full line position, the inclined lugs 32 will bear against the rib 21 and push the sleeve 17 inward against the stop shoulder 16, and thrust forwardly on the adjusting nut 25, carrying the collar 24 therewith. With this movement of the sleeve, the balls 27 can ride on the forward tapered end 20 of the sleeve, as best shown in Figure 2 of the drawings. A tool can now be placed into the collet.

Figure 2:
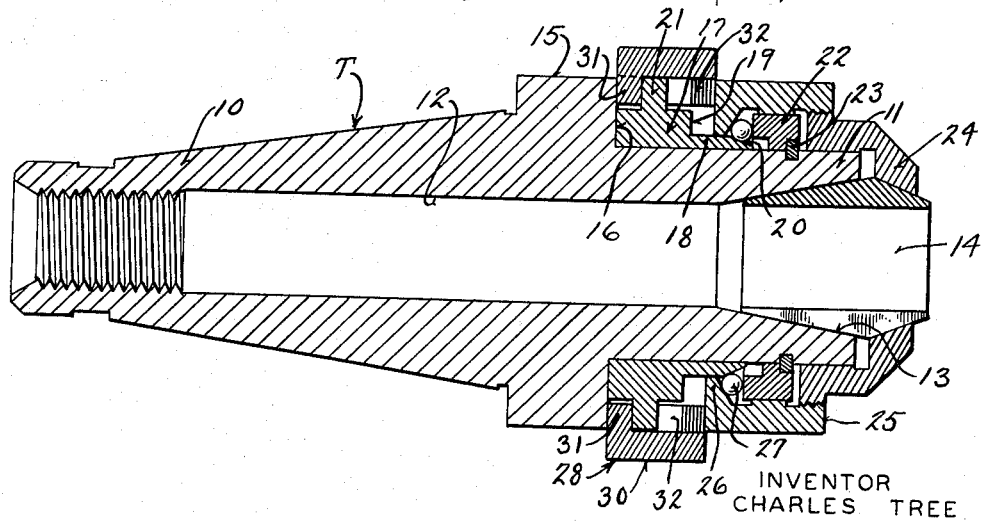
Figure 2 is a longitudinal sectional view through the holder taken on the line 2—2 of Figure 1, looking in the direction of the arrows, the holder being shown in its released position.

Upon the swinging of the handle 29 to the right to the dotted line position shown in Figure 1, the lugs 31 will bear against the stop shoulder 16 and the rib 21 on the shift sleeve 17, and bodily move the shift sleeve 17 forwardly toward the lock ring 22. The balls 27 will now ride up on the tapered portion 20 of the adjusting sleeve and will thrust rearwardly against the flange 26 on the nut 25 causing the nut to move rearwardly carrying the collar 24 therewith. This rearward movement of the collar 24 against the tapered outer face of the collet 14 will contract the collet around the tool.

Thus, it can be seen by the mere manipulation of the hand lever that a tool can be quickly removed from or placed in the holder. By turning the nut 25, the collar 24 can be completely released and collets of different sizes can be placed in the holder.

Various changes in details may be made without departing from the spirit or the scope of this invention, but what I claim as new is:

1. A quick-change tool holder comprising a shank, means on the inner end of the shank for connection with a machine and a socket on the forward end of the shank, a split collet fitted in said socket having a tapered forward end, a shifter sleeve slidably mounted on the shank, means for limiting inward movement of the sleeve on the shank, a lock ring rigidly secured to the shank for limiting the forward movement of said sleeve, an adjusting nut slidably and rotatably mounted on the lock ring, a clamping collar for said collet engaging the tapered end thereof threaded into said nut, the forward end of said shifter sleeve being tapered, and slidable into said nut and defining an annular way, balls in said way engaging the sleeve and confined between the nut and the lock ring, and means including a manipulating handle for shifting said sleeve.

2. A quick-change tool holder comprising a shank having its forward end provided with a tapered socket, a collet having its inner end tapered and fitted in said socket, the outer end of said collet being tapered in the opposite direction, an annular stop shoulder formed on the shank, a shifter sleeve slidable on said shank and limited in its rearward movement by said shoulder, a lock ring detachably secured to the shank for limiting the forward movement of the sleeve, an adjusting nut slidably and rotatably mounted on said lock ring having an inwardly directed flange defining in conjunction with the lock ring an annular way, the forward end of said sleeve being reduced and tapering inwardly for sliding movement into said way, balls confined in said way between said lock ring and said flange and movable over the tapered and reduced end of the sleeve, said sleeve having an annular rib between the stop shoulder and the nut, a collet clamping collar threaded in said nut and engaging the outer tapered end of the collet, and a manipulating handle including a yoke for straddling said sleeve having pusher lugs engaging opposite sides of said rib whereby upon swinging movement of the handle the sleeve can be shifted back and forth, said lugs being spaced with the lugs on one side being disposed between the stop shoulder and the rib and the lugs on the other side being at an angle to the first lugs and confined between the rib and the nut.

References Cited in the file of this patent
UNITED STATES PATENTS

| | | |
|---|---|---|
| 2,383,156 | Phillips | Aug. 21, 1945 |
| 2,400,183 | Wilson | May 14, 1946 |
| 2,730,371 | Pulman | Jan. 10, 1956 |